(12) United States Patent
McFarland et al.

(10) Patent No.: US 9,074,642 B2
(45) Date of Patent: Jul. 7, 2015

(54) HYDRAULIC FILLER FOR A TRANSMISSION

(71) Applicant: GM Global Technology Operations LLC, Detroit, MI (US)

(72) Inventors: Jeffrey J. McFarland, Commerce, MI (US); Chinar S. Ghike, Livonia, MI (US); Caleb G. Harmon, Hartland, MI (US); Vasanthakumar Chinnusamy, Rasipuram (IN)

(73) Assignee: GM Global Technology Operations, LLC, Detroit, MI (US)

( * ) Notice: Subject to any disclaimer, the term of this patent is extended or adjusted under 35 U.S.C. 154(b) by 91 days.

(21) Appl. No.: 13/960,380

(22) Filed: Aug. 6, 2013

(65) Prior Publication Data

US 2014/0110214 A1    Apr. 24, 2014

Related U.S. Application Data

(60) Provisional application No. 61/717,856, filed on Oct. 24, 2012.

(51) Int. Cl.
| | |
|---|---|
| *F16D 25/12* | (2006.01) |
| *F16H 61/30* | (2006.01) |
| *F16H 63/30* | (2006.01) |
| *F16D 25/0638* | (2006.01) |

(52) U.S. Cl.
CPC ............... *F16D 25/12* (2013.01); *F16H 61/30* (2013.01); *F16H 63/3026* (2013.01); *F16D 25/0638* (2013.01)

(58) Field of Classification Search
CPC ............................................. F16D 2500/5014
USPC ................ 192/85.25, 85.39, 106 F; 92/130 D
See application file for complete search history.

(56) References Cited

U.S. PATENT DOCUMENTS

| | | | | |
|---|---|---|---|---|
| 3,891,823 | A * | 6/1975 | Dulude et al. | ............. 219/85.15 |
| 5,630,492 | A | 5/1997 | Yoshikawa | |
| 5,662,198 | A * | 9/1997 | Kojima et al. | ........... 192/48.611 |
| 5,992,834 | A | 11/1999 | Dover | |
| 6,575,439 | B1 * | 6/2003 | Costello et al. | ................. 267/89 |
| 7,127,792 | B2 * | 10/2006 | Wakamori et al. | .............. 29/509 |
| 7,374,157 | B2 * | 5/2008 | Wakamori et al. | ............ 267/179 |

* cited by examiner

*Primary Examiner* — Rodney H Bonck

(57) ABSTRACT

A hydraulic fluid filler for a motor vehicle transmission includes a set of holes through which respective springs of a spring pack extend. The filler is generally positioned adjacent to a single retainer ring or between two retainer rings associated with the spring pack. In some implementations, the filler floats between the two retainer rings, while, in other implementations, the filler is securely attached to one or both of the retainer rings. The filler reduces the volume of one of two cavities, chambers, or cylinders positioned on opposite sides of a piston that selectively interacts with a clutch assembly to engage or disengage the clutch assembly. Reducing the volume of one of the cavities, chambers or cylinders effectively reduces the time period the spring pack is then able to apply a restoring force to the piston.

16 Claims, 4 Drawing Sheets ions 34 and a set of middle tabs 36 that engage respective springs 30. Specifically, each of the middle tabs 36 is press fit into a respective spring 30, and each of the openings 34 is formed by pressing retainer material into a respective spring 30 such that some of the retainer material is crimped around and engages a ring of the distal ends of the spring 30. The hydraulic fluid or oil filler 32 includes a ring 33 provided with a set of openings 40. A respective biasing member, such as, for example, a spring 30, extends through each opening 40. The diameter of the openings 40 can be slightly larger than the outer diameter of the springs 30 so that the filler 32 floats between the retainer rings 26 and 28.

HYDRAULIC FILLER FOR A TRANSMISSION

CROSS-REFERENCE TO RELATED APPLICATION

This application claims the benefit of U.S. Provisional Patent Application No. 61/717,856, filed on Oct. 24, 2012, which is incorporated herein by reference in its entirety.

FIELD

The present disclosure relates to a motor vehicle transmission. More specifically, the present disclosure relates to a hydraulic fluid volume filler for a motor vehicle transmission.

BACKGROUND

The statements in this section merely provide background information related to the present disclosure and may or may not constitute prior art.

Generally, an automatic transmission uses a hydraulic actuator with piston positioned between a pair of cylinders filled with hydraulic fluid to operate clutches. A spring pack operates as a return spring and is positioned on the back surface of the piston. The rotational movement of the hydraulic fluid creates centrifugal forces that increase the pressure in each cylinder. Whether the clutch is engaged or unengaged, ideally, the pressures in the two cylinders resulting from the centrifugal forces are approximately equal such that the spring pack is able to apply a sufficient return force to the piston to keep in the unengaged position or move the piston back to the unengaged position. At start up, however, the pressure in the cylinder on the front side of the piston typically exceeds the pressure on the back side of the piston since the volume of the cylinder on the front side the piston is typically smaller than that of the cylinder on the back side of the piston.

Accordingly, to maximize the utility of the spring pack, it is desirable to minimize the cylinder volume on the back side of the piston.

SUMMARY

A hydraulic fluid filler for a motor vehicle transmission includes a set of holes through which respective springs of a spring pack extend. The filler is generally positioned adjacent to a single retainer ring or between two retainer rings associated with the spring pack. In some implementations, the filler floats between the two retainer rings, while, in other implementations, the filler is securely attached to one or both of the retainer rings. The filler reduces the volume of one of two cavities, chambers, or cylinders positioned on opposite sides of a piston that selectively interacts with a clutch assembly to engage or disengage the clutch assembly. Reducing the volume of one of the cavities, chambers or cylinders effectively reduces the time period the spring pack is then able to apply a restoring force to the piston.

Further features, advantages, and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way. The components in the figures are not necessarily to scale, emphasis instead being placed upon illustrating the principles of the invention. Moreover, in the figures, like reference numerals designate corresponding parts throughout the views. In the drawings.

DETAILED DESCRIPTION

The following description is merely exemplary in nature and is not intended to limit the present disclosure, application, or uses.

Figure 1:
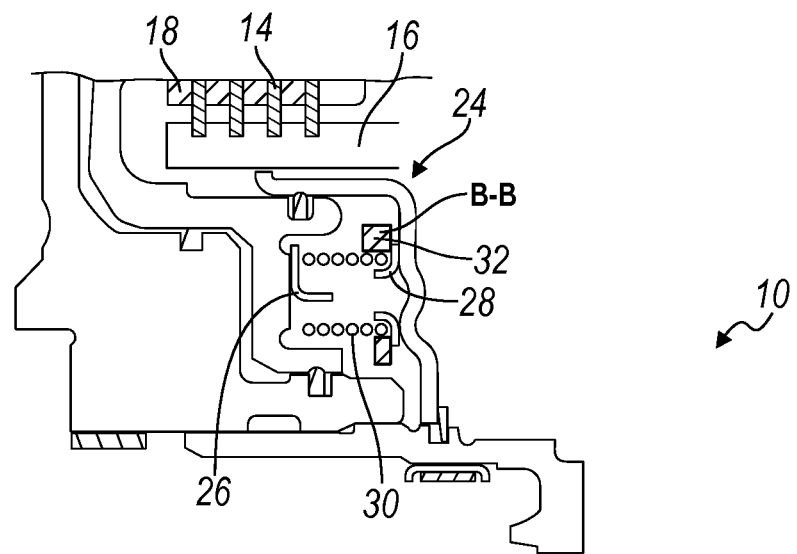
FIG. 1 is partial cross-sectional view of a transmission in accordance with the principles of the present invention.
Figure 1:
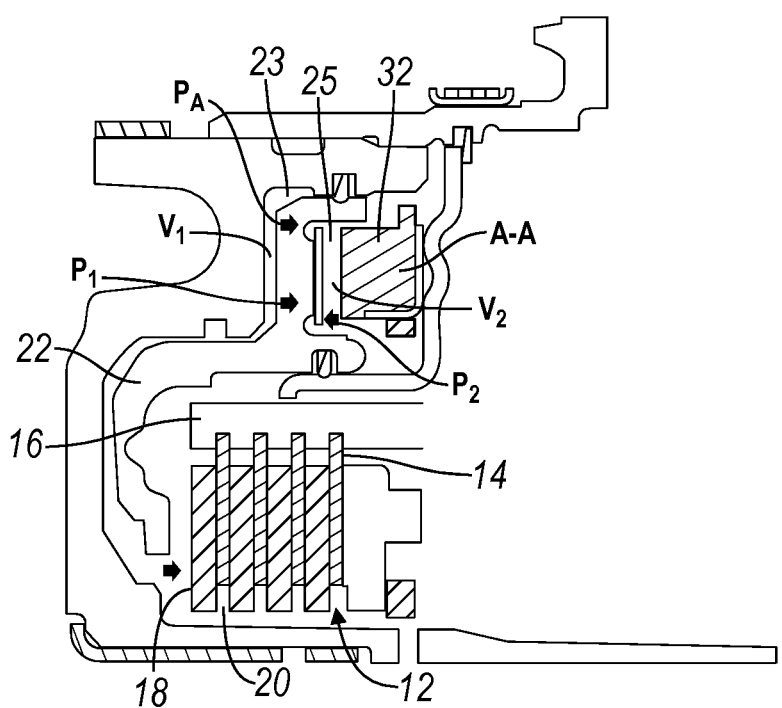

Referring now to the drawings, a partial view of a transmission embodying the principles of the present invention is illustrated in FIG. 1 at 10. The transmission 10 includes a clutch assembly 12 with a first plurality of plates or discs 14 coupled to a housing 16. The first plurality of clutch plates or discs 14 are interleaved with a second plurality of clutch plates or discs 18 coupled to a hub 20. The clutch plates 14 and 18 can be made from any suitable material such as steel. They can each have a layer of material on either side to enhance their frictional capabilities.

The clutch assembly 12 also includes a balanced hydraulic operator having an apply cylinder, chamber or cavity 23. Axially and slidably disposed within the apply cylinder or cavity 23 is a piston 22 which engages and compresses and releases the first and second pluralities of clutch plates or discs 14 and 18. Controlled, pressurized hydraulic fluid, such as oil, is provided to the apply chamber 23 at a pressure $P_A$ to selectively engage the piston 22 with the nearest most clutch plate 18.

On the rear side or face of the piston 22 opposite the apply chamber or cavity 23 is a balance chamber or cavity 25. A circular plate or dam includes suitable fluid tight seals and closes off the balance chamber or cavity 25 and allows axial translation of the piston 22. Positioned within the balance chamber or cavity 25 is a spring pack 24 that provides a biasing or restoring force to the piston 22 towards the left in FIG. 1 to urge disengagement of the clutch assembly 12.

Figure 2:
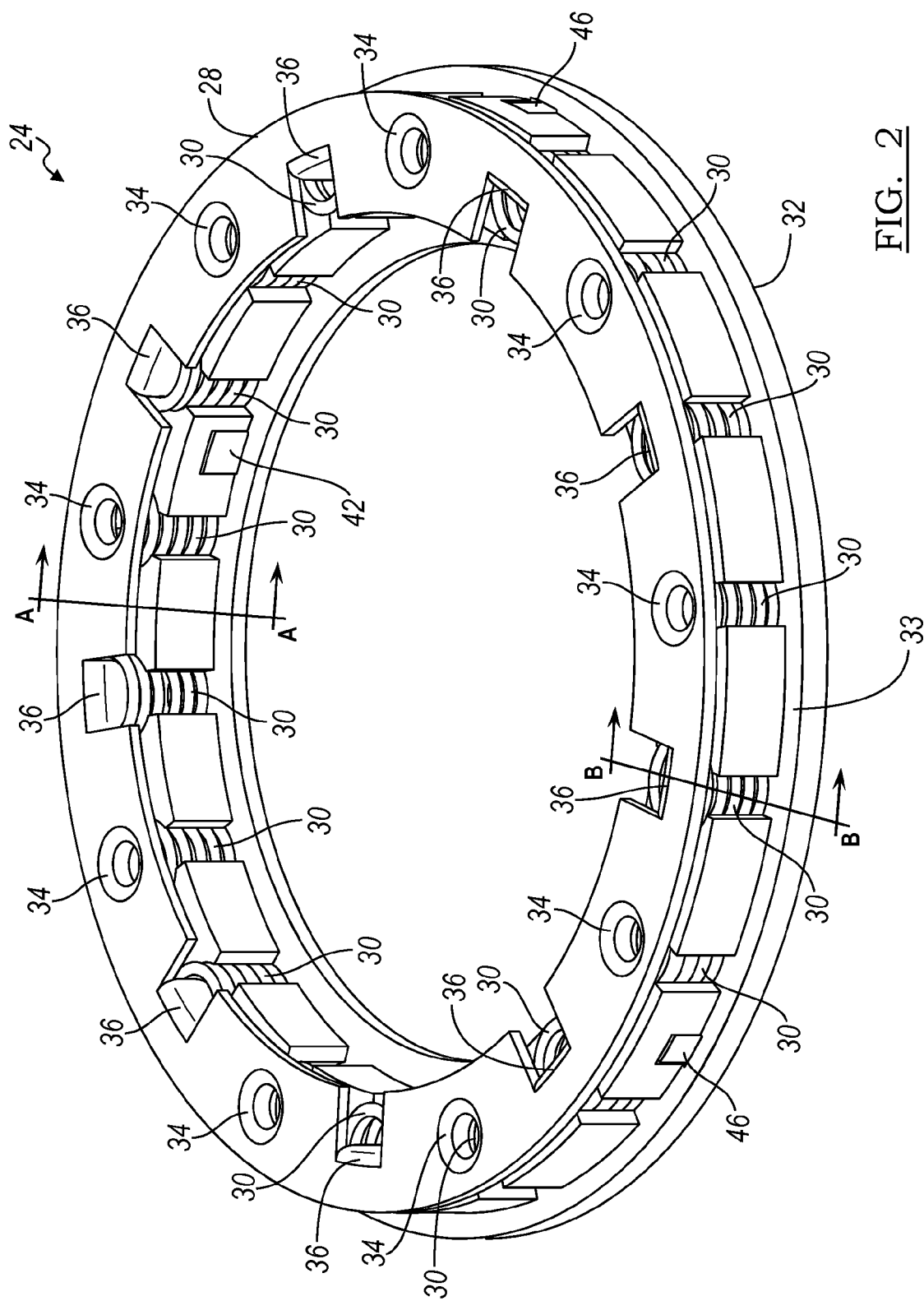
FIG. 2 is a top view of a snap ring with an oil volume filler for the transmission of FIG. 1 in accordance with the principles of the present invention.
Figure 3:
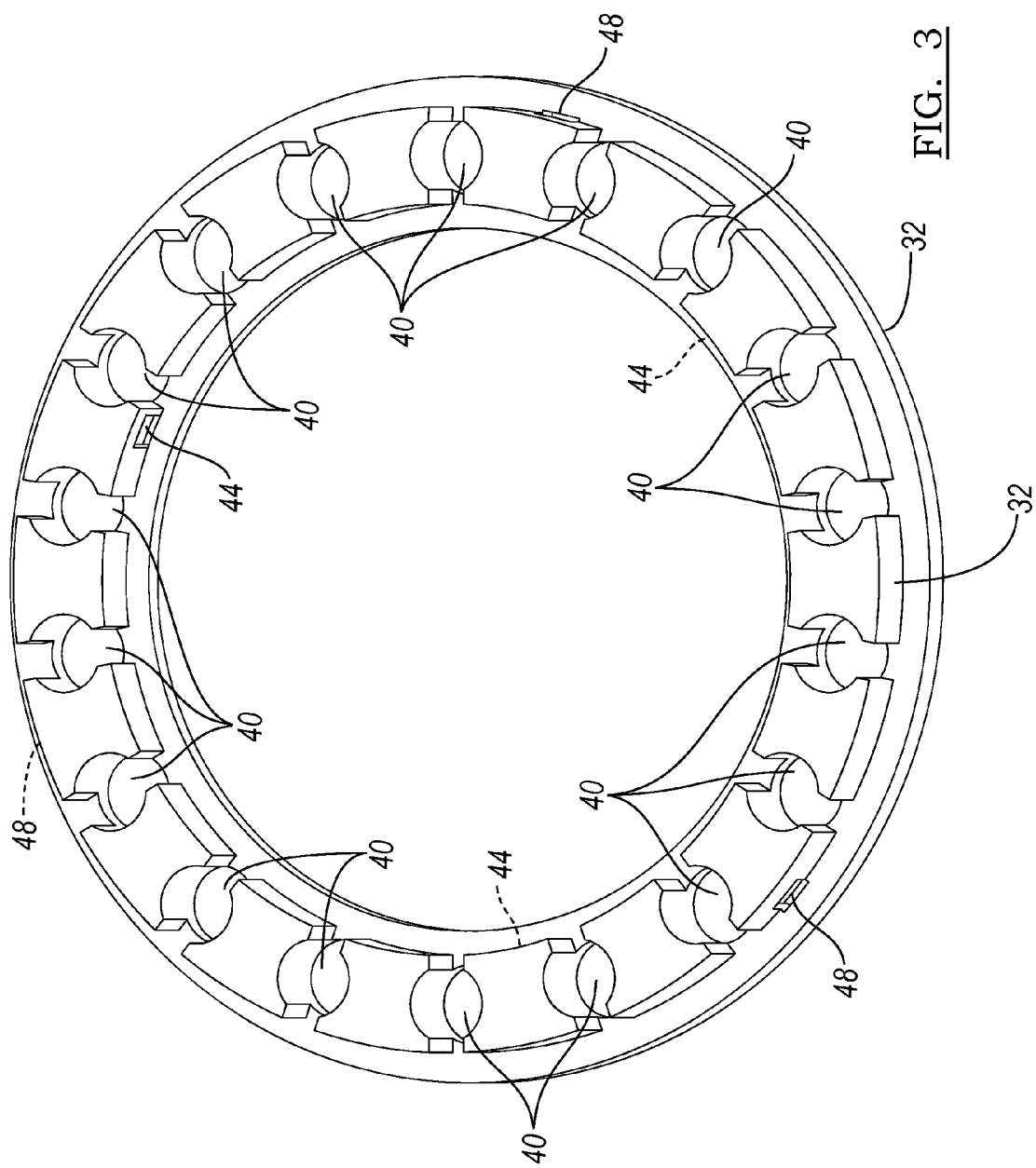
FIG. 3 is a top view of the oil volume filler of FIG. 2.

Referring further to FIGS. 1, 2, and 3, the spring pack 24 includes an annular shaped first retainer ring 26 and an annular shaped second retainer ring 28. A set of springs 30 and an annular shaped hydraulic fluid or oil filler 32 are positioned between the two retainer rings 26 and 28. The filler 32 can be made from any suitable material such as a composite, including nylon.

Each of the retainer rings 26 and 28 include a set of open-

Figure 4:
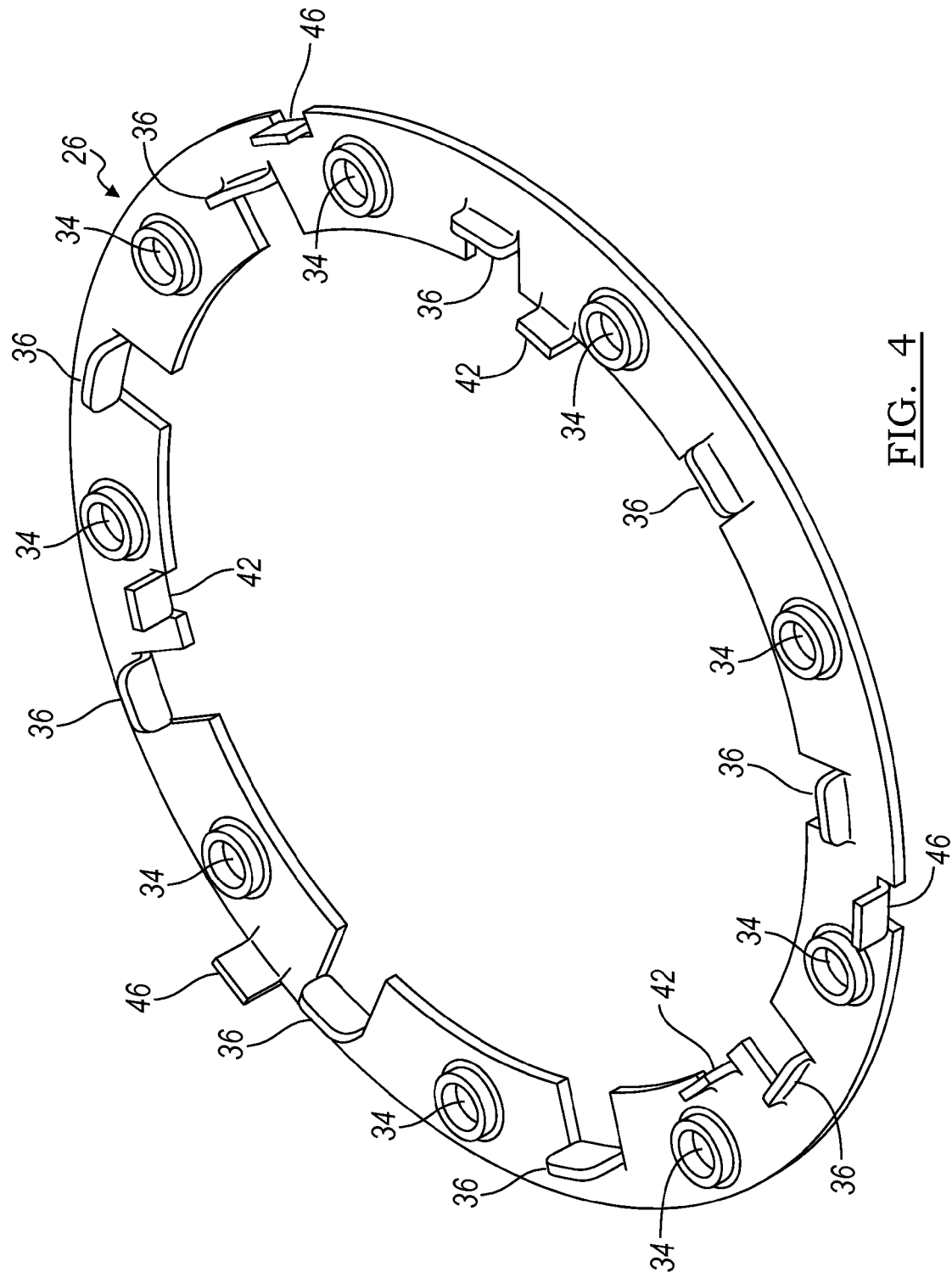
FIG. 4 is a perspective view of a retainer ring for the snap ring shown in FIG. 2.

In some implementations, the filler 32 can be securely attached to either the retainer 26 or the retainer ring 28 such that the filler 32 does not float between the retainer rings 26 and 28. In certain implementations, one or both retainer rings can be provided with inner and outer sets of tabs that engage slots or openings in the filler 32. For example, as shown in FIGS. 3 and 4, the retainer ring 26 may include an inner set of tabs 42 and an outer set of tabs 46 that engage with a set of inner slots 44 and an outer set of slots 48 in the filler 32, respectively, to align the filler 32 in the spring pack 24 and/or to securely attach the filler 32 to a retainer ring.

When the transmission 10 is in use, either or both the hub 16 and the housing 20 spin. They may spin at the same rotational velocity or at different rotational velocities relative to each other. In any case, as the hub 16 and/or housing spin, the hydraulic fluid, such as oil, in the cylinders, chambers, or cavities 23 and 25 rotate as well. The rotational movement of the hydraulic fluid generates centrifugal forces that result in a pressure $P_1$ in the chamber 23 and a pressure $P_2$ in the chamber 25. Ideally, $P_1$ is approximately equal to $P_2$ so that the spring pack 24 is capable of applying restoring force to the piston 22 whether the clutch assembly 12 is engaged or unengaged. For example, in some situations an applied pressure $P_A$ is applied to the piston 22 to engage the disks 14 and 18 of the clutch assembly 12. After the applied pressure $P_A$ is removed, the spring pack 24 is able to apply a restoring force to the piston 22 to move the piston back to its unengaged position if $P_1$ is approximately equal to $P_2$. If, however, $P_1$ exceeds $P_2$, then the spring pack 24 may not be able to apply a restoring force to the piston 22 to overcome the force on the piston 22 generated by the pressure differential between $P_1$ and $P_2$.

Hence, it is desirable to that $P_1$ is approximately equal to $P_2$. But in some situations, such as startup, $P_1$ exceeds $P_2$ for a period of time because more time is required to fill the cylinder or cavity 25 than to fill the cylinder or cavity 23 since the volume $V_1$ of the cylinder or cavity 23 is less than the volume $V_2$ of the cylinder or cavity 25. Accordingly, during some period of time, the restoring force of the spring pack 24 may not be capable of pushing the piston back to an unengaged position when desired. With the use of the oil filler 32 in the spring pack 24, however, the effective volume to be filled by hydraulic fluid in the cylinder or cavity 25 is reduced, which reduces or minimizes the time period when $P_1$ exceeds $P_2$. Accordingly, use of the oil filler 32 increases the efficiency of the transmission 10, particularly during gear changes associated with the transmission 10.

The description of the invention is merely exemplary in nature and variations that do not depart from the gist of the invention are intended to be within the scope of the invention. Such variations are not to be regarded as a departure from the spirit and scope of the invention.

What is claimed is:

1. A hydraulic fluid filler for a motor vehicle transmission comprising:

an annular ring configured to be positioned adjacent a first retainer ring, the annular ring having a set of holes that receive a set of springs, wherein the first retainer ring has a first set of tabs configured to be press fit into a first subset of the set of springs and has a set of openings formed by pressing material from the first retainer ring into a second subset of the set of springs, the combination of the filler, the first retainer ring and the set of springs forming a spring pack, the filler reducing the volume of a clutch assembly to enhance the effectiveness of a biasing force provided by the spring pack to urge disengagement of the clutch assembly, and wherein the annular ring is configured to be positioned between the first retainer ring and a second retainer ring, the second retainer ring having a first set of tabs configured to be press fit into the first subset of the set of springs or the second subset of the set of springs and having a set of openings formed by pressing material from the second retainer ring into either the first subset or the second subset of the set of springs unoccupied by the first set of tabs of the second retainer ring, the combination of the filler, the first retainer ring, the second retainer ring and the set of springs forming the spring pack, the annular ring including a first set of slots configured to engage with a second set of tabs of the first retainer ring or the second retainer ring.

2. The hydraulic filler of claim 1 wherein the annular ring includes a second set of slots configured to engage with a third set of tabs of the first retainer ring or the second retainer ring.

3. The hydraulic filler of claim 2 wherein the engagement of each slot of the first set of slots with a respective tab of the second set of tabs of the first retainer ring or the second retainer ring and the engagement of each slot of the second set of slots with a respective tab of the third set of tabs of the first retainer ring or the second retainer ring aligns the filler with the first retainer ring or the second retainer ring or with both the first retainer ring and the second retainer ring.

4. The hydraulic filler of claim 2 wherein the engagement of each slot of the first set of slots with a respective tab of the second set of tabs of the first retainer ring or the second retainer ring and the engagement of each slot of the second set of slots with a respective tab of the third set of tabs of the first retainer ring or the second retainer ring secures the filler with the first retainer ring or the second retainer ring or with both the first retainer ring and the second retainer ring.

5. The hydraulic filler of claim 1 wherein the filler is made of a composite.

6. The hydraulic filler of claim 1 wherein the filler is made of nylon.

7. A spring pack for a motor vehicle transmission comprising:

a filler having a generally annular shape and having a set of spaced apart openings;

a set of springs, each spring being positioned in a respective opening of the set of openings; and a first retainer ring, wherein the filler and the set of springs are positioned adjacent the first retainer ring, the filler reducing the volume in a clutch assembly to enhance the effectiveness of a biasing force provided by the spring back to urge disengagement of the clutch assembly, the filler including a first set of slots that engages with a second set of tabs of the first retainer ring.

8. The spring pack of claim 7 wherein the first retainer ring has a first set of tabs press fitted into a first subset of the set of springs and has a set of openings formed by pressing material from the first retainer ring into a second subset of the set of springs.

9. The spring pack of claim 8 further comprising a second retainer ring, wherein the filler and the set of springs are positioned between the first retainer ring and the second retainer ring.

10. The spring pack of claim 9 wherein the second retainer ring has a first set of tabs press fitted into the first subset of the set of springs or the second subset of the set of springs and has a set of openings formed by pressing material from the second retainer ring into the first subset or the second subset of the set of springs unoccupied by the first set of tabs of the second retainer ring.

11. The spring pack of claim 7 wherein the filler includes a second set of slots that engages with a third set of tabs of the first retainer ring.

12. The spring pack of claim 11 wherein the engagement of each slot of the first set of slots with a respective tab of the second set of tabs of the first retainer ring and the engagement of each slot of the second set of slots with a respective tab of the third set of tabs of the first retainer ring aligns the filler with the first retainer ring.

13. The spring pack of claim 11 wherein the engagement of each slot of the first set of slots with a respective tab of the second set of tabs of the first retainer ring and the engagement of each slot of the second set of slots with a respective tab of the third set of tabs of the first retainer ring secures the filler with the first retainer ring.

14. The spring pack of claim 11 wherein the first set of tabs is positioned between the second set of tabs and the third set of tabs, the second set of tabs being an outer set of tabs and the third set of tabs being an inner set of tabs.

15. The spring pack of claim 7 wherein the filler is made of a composite.

16. The spring pack of claim 7 wherein the filler is made of nylon.

* * * * *